US008622248B2

(12) United States Patent
Sacchet

(10) Patent No.: US 8,622,248 B2
(45) Date of Patent: Jan. 7, 2014

(54) MODULAR DYE METER AND METHOD OF PREPARING COMPOUNDS

(71) Applicant: Hero Europe S.R.L., Salmour (IT)

(72) Inventor: Alessandro Sacchet, Salmour (IT)

(73) Assignee: Hero Europe S.R.L., Cuneo (CN) (IT)

( * ) Notice: Subject to any disclaimer, the term of this patent is extended or adjusted under 35 U.S.C. 154(b) by 0 days.

(21) Appl. No.: 13/961,734

(22) Filed: Aug. 7, 2013

(65) Prior Publication Data

US 2013/0329516 A1  Dec. 12, 2013

Related U.S. Application Data

(63) Continuation of application No. 12/916,354, filed on Oct. 29, 2010, now Pat. No. 8,528,781, which is a continuation-in-part of application No. 11/908,940, filed as application No. PCT/IT2005/000194 on Apr. 7, 2005, now abandoned.

(51) Int. Cl.
  *B01F 15/02* (2006.01)
(52) U.S. Cl.
  USPC .................. 222/144.5; 222/138; 222/333
(58) Field of Classification Search
  USPC ............. 222/129.1, 145.1, 144.5, 144, 145.5, 222/138; 366/152.2, 152.1, 154.1, 155.1
  See application file for complete search history.

(56) References Cited

U.S. PATENT DOCUMENTS 3,348,774 A * 10/1967 Wiggins .......................... 239/70
4,046,287 A    9/1977 Hoekstra et al.
4,323,097 A * 4/1982 Achen ........................... 141/168
4,465,016 A    8/1984 Weber
4,705,083 A   11/1987 Rossetti (Continued)

FOREIGN PATENT DOCUMENTS

GB   1272258 A   4/1972

OTHER PUBLICATIONS

Nordimpianti Technologies S.R.L. et al., International Search Report and Written Opinion of the International Searching Authority dated Jan. 27, 2006 issued in parent PCT Patent Application No. PCT/IT/2005/000194 filed Apr. 7, 2005.

(Continued)

*Primary Examiner* — Paul R Durand
*Assistant Examiner* — Donnell Long
(74) *Attorney, Agent, or Firm* — David A. Farah; Sheldon Mak & Anderson PC

(57) ABSTRACT

A method of preparing compounds comprising a plurality of components, the method comprising providing a modular dye meter, introducing component into one or more than one modular batching member of the modular dye meter, where the compound to be prepared comprises the one or more than one component, activating the internal rotor of one or more than one of the batching and delivering devices, thereby causing the internal rotors to rotate in the first direction, where rotation of the internal rotor moves component through the progressive recesses of the batching and delivering device through the corresponding delivery duct and through the dispenser, and thereby into a vessel for containing the compound, causing the rotation of the internal rotor in the first direction to cease, causing the internal rotor to rotate in a second direction, where the second direction is opposite to the first direction, thereby moving component back through the delivery duct into the corresponding batching and delivering device, and causing the rotation of the internal rotor in the second direction to cease.

6 Claims, 3 Drawing Sheets

(56) References Cited

U.S. PATENT DOCUMENTS

| | | | |
|---|---|---|---|
| 4,967,938 A | 11/1990 | Hellenberg | |
| 5,046,666 A | 9/1991 | Ono | |
| 5,078,302 A | 1/1992 | Hellenberg | |
| 5,119,973 A | 6/1992 | Miller et al. | |
| 5,193,718 A * | 3/1993 | Hassell et al. | 222/129.1 |
| 5,279,448 A * | 1/1994 | Hanlin et al. | 222/132 |
| 5,609,275 A | 3/1997 | Brown et al. | |
| 5,690,252 A * | 11/1997 | Oleksiewicz et al. | 222/56 |
| 5,697,527 A | 12/1997 | Altieri et al. | |
| 5,711,458 A | 1/1998 | Langeveld et al. | |
| 5,829,636 A | 11/1998 | Vuong et al. | |
| 5,836,482 A | 11/1998 | Ophardt et al. | |
| 6,360,961 B1 | 3/2002 | Marazzi | |
| 6,460,734 B1 | 10/2002 | Schroeder et al. | |
| 6,543,490 B1 | 4/2003 | Owens | |
| 6,688,134 B2 * | 2/2004 | Barton et al. | 62/390 |
| 6,726,065 B2 | 4/2004 | Sanders | |
| 6,886,717 B2 * | 5/2005 | Sanders | 222/333 |
| 7,121,430 B2 * | 10/2006 | Mink et al. | 222/135 |
| 2003/0146244 A1 | 8/2003 | Sanders | |
| 2003/0197023 A1 | 10/2003 | Chuen | |
| 2006/0278663 A1 * | 12/2006 | Mink et al. | 222/372 |
| 2008/0212401 A1 | 9/2008 | Alessandro | |

OTHER PUBLICATIONS

Sacchet, A., Office Action dated Nov. 27, 2009 for U.S. Appl. No. 11/908,940, filed Sep. 17, 2007.

Sacchet, A., Office Action dated Apr. 29, 2010 for U.S. Appl. No. 11/908,940, filed Sep. 17, 2007.

Sacchet, A., Office Action dated Apr. 12, 2012 issued in parent U.S. Appl. No. 12/916,354, filed Oct. 29, 2010.

Sacchet, A., Office Action dated Aug. 8, 2012 issued in parent U.S. Appl. No. 12/916,354, filed Oct. 29, 2010.

Sacchet, A., Office Action dated Nov. 5, 2012 issued in parent U.S. Appl. No. 12/916,354, filed Oct. 29, 2010.

Sacchet, A., Office Action dated May 3, 2013 issued in parent U.S. Appl. No. 12/916,354, filed Oct. 29, 2010.

* cited by examiner

MODULAR DYE METER AND METHOD OF PREPARING COMPOUNDS

CROSS-REFERENCE TO RELATED APPLICATION SECTION

The present application is a continuation of U.S. patent application Ser. No. 12/916,354, titled "Modular Dye Meter and Method of Preparing Compounds," filed Oct. 29, 2010, which is a continuation-in-part of U.S. patent application Ser. No. 11/908,940, titled "Modular Dye Meter," filed Sep. 17, 2007, which is a 371 of International Patent Application No. PCT/IT2005/000194, titled "Modular Dye Meter," filed Apr. 7, 2005, the contents of which are incorporated in this disclosure by reference in their entirety.

BACKGROUND

Modular dye meters are used to produce compounds comprising a plurality of components, such as colored compounds including enamels and paints. Modular dye meters usually comprise a plurality of tanks for storing individual components and corresponding batching and delivering devices which take specific amounts of each component from the corresponding tank and combine the components depending on desired composition of the compound. In general, there are two types of dye meters: first, dye meters with tanks in a fixed position connected through delivery ducts to a delivering head placed above a vessel for receiving the components of the compound, where delivery of individual components can occur simultaneously; and second, dye meters where the tanks are placed on platforms which rotate to place the individual tanks, or individual sub-groups of tanks, in turn, on the vessel to deliver the components of the compound. Additionally, some modular dye meters batch components based on weight of the component, and some modular dye meters batch components based on volume of the component. Modular dye meters with weight-based batching are typically more accurate but relatively slower compared with modular dye meters with volume-based batching.

All known dye meters have several disadvantages. First, they are complex leading to reliability problems over time. In particular, since all tanks share the same dye batching and delivering devices, the malfunction of one tank or even routine maintenance can stop production of the compound for a considerable time while spare parts and specialized assistance is obtained. Second, modular dye meters are relatively costly, particularly for small scale manufacturing. Third, modular dye meters are difficult to reconfigure to change the composition of the compound being produced. Fourth, modular dye meters suffer from dripping problems at the end of the delivery ducts, and in such drops both waste components and components can solidify within the delivery ducts causing clogs.

Therefore, there is a need for a modular dye meter and a method of preparing compounds that are not associated with these disadvantages.

SUMMARY

According to one embodiment of the present invention, there is provided a method of preparing compounds comprising a plurality of components, the method comprising, a) providing a modular dye meter, where the modular dye meter comprises i) one or more than one modular batching member, where each modular batching member comprises a container for storing one component of the compound and comprises a batching and delivering device for moving the component stored in the container; ii) a dispenser; and iii) a delivery duct corresponding to each batching and delivering device, and connecting each batching and delivering device to the dispenser; where each batching and delivering device comprises a pump comprising an inlet end connected to the container, and comprises an outlet end connected to the delivery duct; where each pump comprises an external stator housing and an internal rotor within the external stator, where the internal rotor has an axis of rotation, and where the internal rotor is capable of rotating in a first direction around the axis of rotation, and is capable of rotating in a second direction that is around the axis of rotation and where the first direction is opposite of the second direction; where each external stator housing comprises progressive recesses and each internal rotor comprises progressive recesses; where rotation of the internal rotor relative to the external stator housing moves component inside the pump through the progressive recesses and toward the delivery duct when the internal rotor rotates in the first direction, or away from the delivery duct when the internal rotor rotates in the second direction. Next, the method comprises introducing component into one or more than one modular batching member of the modular dye meter, where the compound to be prepared comprises the one or more than one component. Then, the method comprises activating the internal rotor of one or more than one of the batching and delivering devices, thereby causing the internal rotors to rotate in the first direction, where rotation of the internal rotor moves component through the progressive recesses of the batching and delivering device through the corresponding delivery duct and through the dispenser, and thereby into a vessel for containing the compound. Next, the method comprises causing the rotation of the internal rotor in the first direction to cease. Then, the method comprises causing the internal rotor to rotate in a second direction, where the second direction is opposite to the first direction, thereby moving component back through the delivery duct into the corresponding batching and delivering device. Next, the method comprises causing the rotation of the internal rotor in the second direction to cease.

In one embodiment, the first direction is clockwise around the axis of the internal rotor. In another embodiment, the first direction is counter-clockwise around the axis of the internal rotor. In one embodiment, the second direction is clockwise around the axis of the internal rotor. In another embodiment, the second direction is counter-clockwise around the axis of the internal rotor.

FIGURES

These and other features, aspects and advantages of the present invention will become better understood with regard to the following description, appended claims, and accompanying figures where:

DESCRIPTION

According to one embodiment of the present invention, there is provided a modular batching member for use in a modular dye meter. According to another embodiment of the present invention, there is provided a modular dye meter comprising one or more than one modular batching member according to the present invention. According to another embodiment of the present invention, there is provided a dye metering machine comprising a modular dye meter according to the present invention. According to another embodiment of the present invention, there is provided a method of preparing compounds. In one embodiment, the method comprises providing a modular dye meter according to the present invention. The modular dye meter of the present invention can be easily, economically and quickly configured to different production needs with respect to volumes of components, the number of components or the type of components that comprise compound. Further, the modular dye meter of the present invention is a more accurate and reliable volumetric batching system than known systems. Additionally, the modular dye meter of the present invention obviates the problem with dripping from the delivery ducts associated with known systems. The devices and method will now be disclosed in detail.

All dimensions specified in this disclosure are by way of example only and are not intended to be limiting. Further, the proportions shown in these Figures are not necessarily to scale. As will be understood by those with skill in the art with reference to this disclosure, the actual dimensions of any device or part of a device disclosed in this disclosure will be determined by its intended use.

The devices of the present invention and their component parts comprise any suitable material for the intended purpose of the device, as will be understood by those with skill in the art with reference to this disclosure.

The devices of the present invention and their component parts can be constructed according to standard techniques, as will be understood by those with skill in the art with reference to this disclosure.

As used in this disclosure, except where the context requires otherwise, the method steps disclosed are not intended to be limiting nor are they intended to indicate that each step is essential to the method or that each step must occur in the order disclosed.

Figure 1:
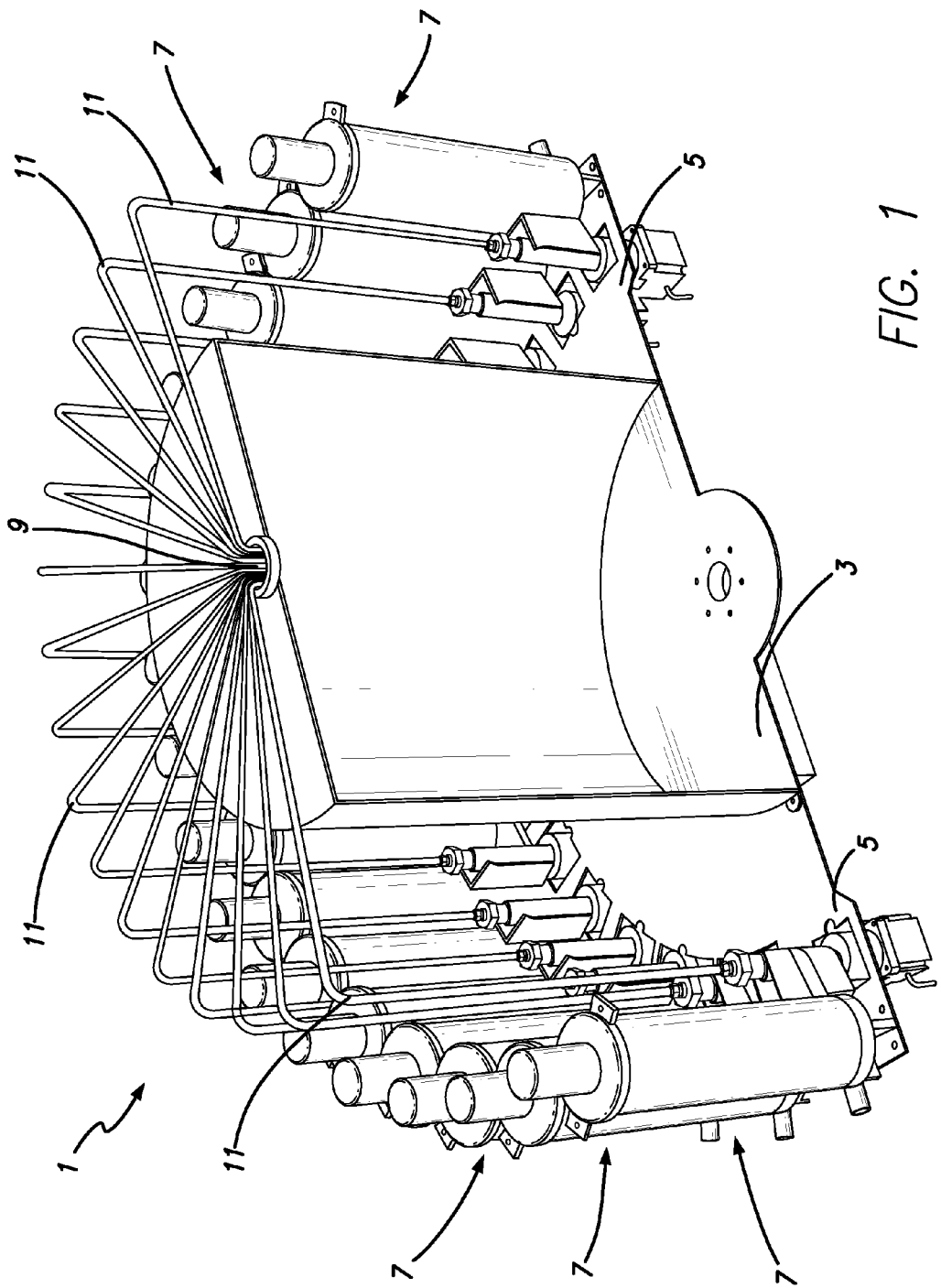
FIG. 1 is a lateral perspective view of one embodiment of a modular dye meter according to the present invention comprising a plurality of modular batching members according to the present invention.
Figure 3:
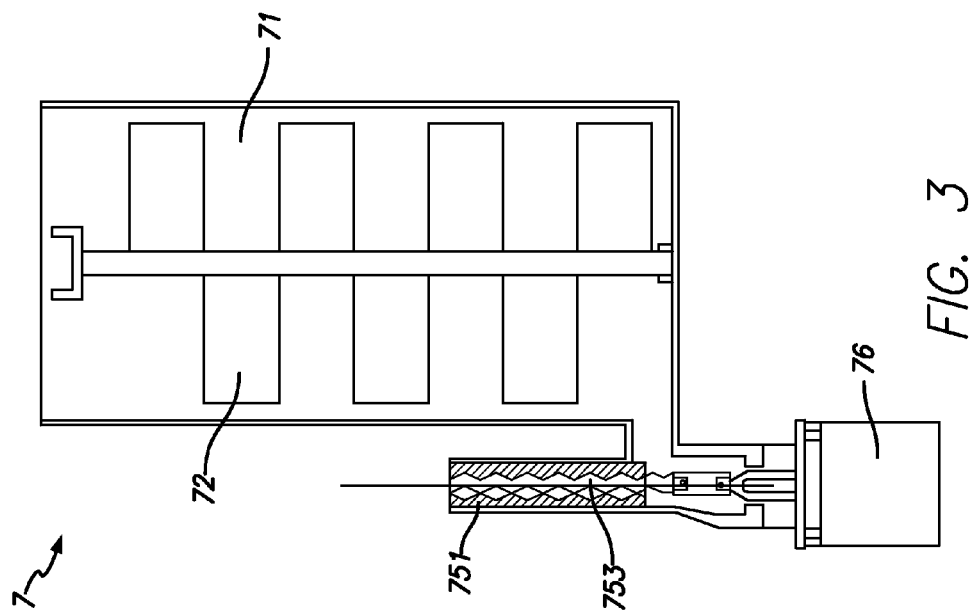
FIG. 3 is a schematic, cross-sectional lateral perspective view of the modular batching member shown in FIG. 2.
Figure 2:
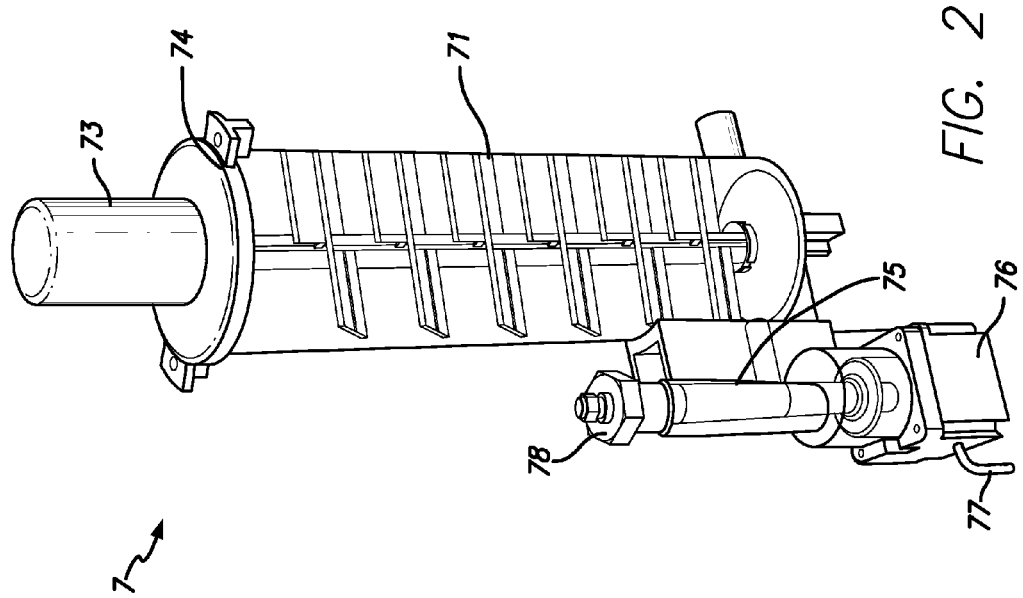
FIG. 2 is a lateral perspective view of one embodiment of a modular batching member of the modular dye meter shown in FIG. 1.

According to one embodiment, there is provided a modular dye meter for preparing a compound from one or more than one component, and in particular from a plurality of components, such as for example enamels and paints or other colored compounds. The modular dye meter comprises one or more than one modular batching member according to the present invention, where each modular batching member stores one component that the compound comprises. Referring now to FIG. 1, FIG. 2 and FIG. 3, there are shown, respectively, a lateral perspective view of one embodiment of a modular dye meter according to the present invention comprising a plurality of modular batching members according to the present invention (FIG. 1); a lateral perspective view of one embodiment of a modular batching member of the modular dye meter shown in FIG. 1 (FIG. 2); and a schematic, cross-sectional lateral perspective view of the modular batching member shown in FIG. 3. As can be seen, in one embodiment, the modular dye meter 1 comprises a supporting structure 3 and a plurality of seats 5 connected to the supporting structure 3. The modular dye meter 1 further comprises one or more than one modular batching member 7, where each modular batching member 7 is connected to one of the plurality of seats 5, such as for example by a mechanical connector. The modular dye meter 1 further comprises a dispenser 9, such as for example a delivering head comprising a plurality of delivering nozzles. The modular dye meter 1 further comprises one or more than one delivery duct 11, where each delivery duct connects one modular batching member 7 to the dispenser 9, thereby allowing fluid to flow from the modular batching member 7 to the dispenser 9. The dispenser 9 delivers the individual components from the modular batching members 7 to a vessel to produce the compound. In a preferred embodiment, each delivery duct 11 can be quickly and easily disconnected from the modular batching member 7 to allow removal of the modular batching member 7 from the corresponding seat 5.

Figure 5:
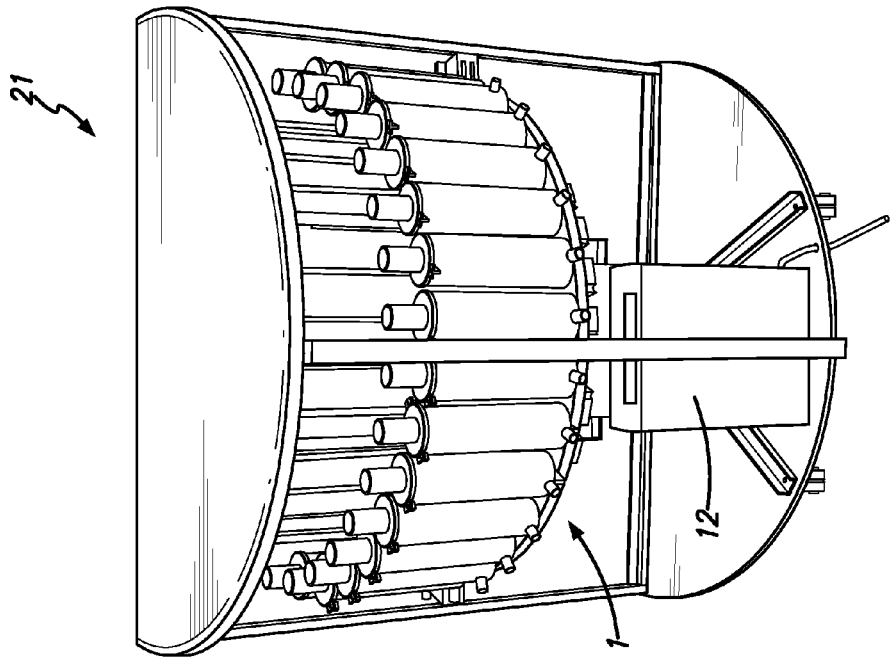
FIG. 5 is a lateral perspective cutaway view of the dye metering machine shown in FIG. 4.

As can be seen in FIG. 1 and FIG. 5, in a preferred embodiment, the plurality of seats 5 (and corresponding modular batching members 7 when connected) and the corresponding delivery ducts 11 are arranged radially around the dispenser 9; however, the plurality of seats 5 (and corresponding modular batching members 7 when connected) and the corresponding delivery ducts 11 can be arranged linearly or in another configuration, as will be understood by those with skill in the art with reference to this disclosure.

Referring now particularly to FIG. 2 and FIG. 3, each modular batching member 7 according to the present invention comprises a container 71, and further comprises a batching and delivering device 75 for batching and delivering the component contained within the container 71 of the modular batching member 7. In one embodiment, as shown in the Figures, the container 71 is a cylinder; however, the container 71 can be any suitable shape for the intended purpose, as will be understood by those with skill in the art with reference to this disclosure. The modular batching member 7 further comprises one or more than one blade 72 within and co-axial with each container 71. Each modular batching member 7 further comprises an actuating motor 73 for rotating the one or more than one blade 72 within the container 71, where rotating the component in the container 71 keeps the component in suspension. In one embodiment, the actuating motor 73 is housed in an upper cover 74 of the container 71. As will be understood by those with skill in the art with reference to this disclosure, additional component can be easily added to the container 71 by removing the upper cover 74 thereby accessing the interior of the container 71.

In a preferred embodiment, as can be seen in FIG. 1, each of the plurality of seats 5 is connected to a modular batching member 7. In another embodiment, at least one of the plurality of seats 5 is not connected to a modular batching member 7. In another one embodiment, only one seat 5 of the plurality of seats 5 is connected to a modular batching member 7.

The modular dye meter 1 further comprises managing means for controlling the batching and delivering device 75. In one embodiment, the modular dye meter 1 further comprises a first electric connection connecting each one of the plurality of seats 5 to the corresponding modular batching member 7. The first electric connections supply current from a current source to a batching and delivering device 75 of the corresponding modular batching member 7 according to instructions from the managing means to provide the correct amount of component to the dispenser 9. The managing means can be any suitable structure or device, as will be understood by those with skill in the art with reference to this disclosure, suitable for managing and driving dye meters, suitably modified to manage the individual modular batching members 7 to guarantee the correct batching of components to produce the compound. In one embodiment, the managing means is a personal computer. In one embodiment, the managing means controls the modular batching members 7 through the first electric connections. In another embodiment, the managing means controls the modular batching members 7 by wireless means.

The batching and delivering device 75 delivers specific amounts of the component contained in the container 71 to the dispenser 9 through the delivery duct 11. In one embodiment, the batching and delivering device 75 comprises a second fluid connector connected to the delivery duct 11. The modular dye meter 1 further comprises a second electric connector 77 operatively connected to the first electric connector, preferably through a quick-connection electric connector or pin 77 without using tools, to be electrically supplied and controlled by the managing means for delivering specific amounts of the component contained in the container 71 to the dispenser 9 through the delivery duct 11.

In a preferred embodiment, as shown particularly in FIG. 3, the batching and delivering device 75 comprises one or more than one pump 75 comprising an inlet end connected to the container 71, and an outlet end connected to the delivery duct 11. The pump 75 further comprises an external stator housing 751 and an internal rotor 753 within the external stator, where the internal rotor 753 is rotatingly driven by a controlling motor 76 equipped with the second electric connector 77. The pump further comprises progressive recesses in the housing 751. The internal rotor 753 is shaped as a worm screw comprising progressive recesses whose relative rotation with respect to the progressive recesses in the stator housing 751 moves component inside the pump toward the delivery duct 11 (and therefore toward the dispenser 9) or away from the delivery duct 11 (and therefore toward the container 71) depending on the rotational direction of the internal rotor 753. The specific amount of component moved depends on the amount of rotation of the internal rotor 753. In a preferred embodiment, the outlet end of the pump 75 comprises a quick connector 78 connecting the pump 75 to the delivery duct 11. As will be understood by those with skill in the art with reference to this disclosure, the batching and delivering device 75 can comprise any other suitable structure including any other combination of traditional pumping means and valves, both for a volumetric batching and for a weight batching.

The advantages of using a pump 75 with progressive recesses are numerous. First, when the internal rotor 753 is stopped with respect to the external stator 751, the pump 75 with progressive recesses produces a perfect seal. Second, the pump 75 is very reliable because the only moving part needed to move component is the internal rotor 753 and wear from friction due to the relative movement between internal rotor 753 and external stator 751 is negligible. Third, contrary to pumps which utilize a piston where the pumping is cyclic due to the piston stroke, the pump 75 with progressive recesses allows a continuous movement of the component from the container 71 to the dispenser 9. Fourth, the pump 75 with progressive recesses allows an extremely accurate volumetric delivery of a component that is proportional to the rotation of the internal rotor 753 because the rotation of the internal rotor is controlled down to the order of fractions of degree by the managing means that control the controlling motor 76. Therefore, using the pump 75 with progressive recesses obviates the need to calibrate the modular dye meter 1 during installation reducing tooling times and costs.

As will be understood by those with skill in the art with reference to this disclosure, a modular batching member 7 can be installed in the modular dye meter 1 by inserting the modular batching member 7 in one of the seats 5. In one embodiment, the modular batching member 7 is fixed in the corresponding seat 5 with a mechanical connector. Then, the delivery duct 11 is connected to the modular batching member 7, and the first electric connector is connected to the modular batching member 7. Each modular batching member 7 is uninstalled from the modular dye meter 1 as needed to replace, maintain or refill the modular batching member 7 by reversing the process.

Figure 4:
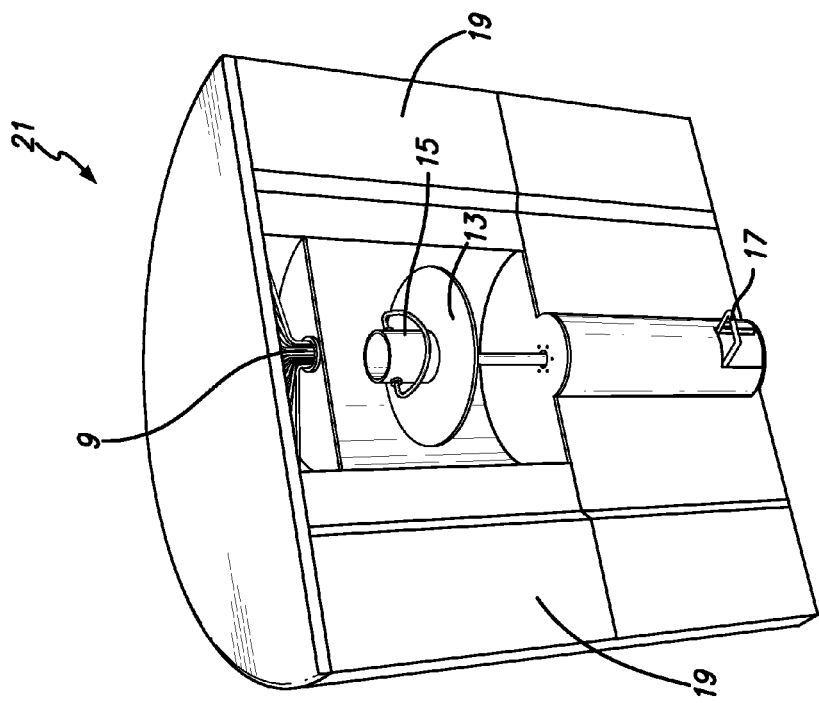
FIG. 4 is a lateral perspective view of a dye metering machine according to the present invention comprising the modular dye meter shown in FIG. 1.

According to another embodiment of the present invention, there is provided a dye metering machine comprising a modular dye meter according to the present invention. Referring now to FIG. 4 and FIG. 5, there are shown, respectively, a lateral perspective view of a dye metering machine according to the present invention comprising the modular dye meter shown in FIG. 1 (FIG. 4); and a lateral perspective cutaway view of the dye metering machine shown in FIG. 4 (FIG. 5). As can be seen, the dye metering machine 21 comprises a containing structure 12 housing a modular dye meter 1 according to the present invention. The dye metering machine 21 further comprises a plate 13 that supports and positions a vessel 15 for receiving the compound from the dispenser 9. In one embodiment, the plate 13 is adjustable relative to the dispenser 9, such as for example through a screw-nut screw system or a by pneumatic piston driven by a pedal 17 as shown in FIG. 4, to optimally determine the position of the vessel 15 with respect to the dispenser 9. In a preferred embodiment, the containing structure 12 comprises coating panels 19 to protect the modular dye meter 1 from external agents. In a preferred embodiment, at least part of the coating panels 19 are connected to the remainder of the containing structure 12 in a manner such that the coating panels 19 can be easily removed without the use of tools, to facilitate access to the modular dye meter 1 for maintenance purposes or to remove, recharge, add or replace one or more than one of the modular batching members 7. Additionally, the containing structure 12 comprises means for electrically supplying the modular dye meter 1.

As will be understood by those with skill in the art with reference to this disclosure, the modular dye meter 1 according to the present invention has a series of advantages with respect to known modular dye meters. These advantages that are related both to practicality of use and to optimization of costs and resources. First, the modular dye meter 1 of the present invention can be configured for use with only the minimum number of modular batching members 7 containing the types of components that are necessary for producing the compound. Second, to modify the composition of the compound being produced, the configuration of modular batching members 7 in the modular dye meter 1 can be quickly, simply and economically changed by replacing one or more than one of the modular batching members 7, or adding additional modular batching members 7 containing the components for new composition. Third, in case of the malfunction of one or more of the modular batching members 7, the malfunctioning modular batching member 7 can be quickly and simply replaced, even without the use of tools and generally without the need for service from the manufacturer, or if a spare modular batching member 7 is not readily available, production of compounds that do not require the component contained in the malfunctioning modular batching member 7 can continue avoiding complete cessation of production.

According to another embodiment of the present invention, there is provided a method of preparing compounds comprising a plurality of components. In one embodiment, the method comprises providing a modular dye meter according to the present invention, or providing a dye metering machine comprising a modular dye meter according to the present invention. The method further comprises introducing one component into one or more than one modular batching member of the modular dye meter, where the compound to be prepared comprises the components introduced. Next, the managing means activates the internal rotor of the batching and delivering devices corresponding to each of the one or more than one modular batching member causing the internal rotor to rotate in a first direction, where rotation of the internal rotor in the first direction moves component from the corresponding modular batching member through the progressive recesses of the batching and delivering device through the delivery duct through the dispenser, and thereby into a vessel for containing the compound. In one embodiment, the first direction is clockwise around the axis of the internal rotor. In another embodiment, the first direction is counter-clockwise around the axis of the internal rotor. Then, the managing means causes the rotation of the internal rotor in the first direction to cease and causes the internal rotor to rotate in a second direction, where the second direction is opposite to the first direction, thereby moving component from the dispenser back through the delivery duct preventing drips of component from exiting the dispenser. Next, the managing means causes the rotation of the internal rotor in the second direction to cease. Movement of the internal stator in the second direction advantageously obviates component waste, and prevents solidifying of excess component within the delivery ducts. In one embodiment, the second direction is clockwise around the axis of the internal rotor. In another embodiment, the second direction is counter-clockwise around the axis of the internal rotor.

Although the present invention has been discussed in considerable detail with reference to certain preferred embodiments, other embodiments are possible. Therefore, the scope of the appended claims should not be limited to the description of preferred embodiments contained in this disclosure.

What is claimed is:

1. A modular dye meter comprising:
   a) one or more than one modular batching member, where each modular batching member comprises a container for storing a component of a compound and comprises a batching and delivering device for moving the component stored in the container, the batching and delivering device comprising a second fluid connecting means and a second electric connecting means;
   b) a dispenser comprising a delivery head equipped with a plurality of delivery nozzles;
   c) a delivery duct corresponding to each batching and delivering device, and connecting each batching and delivering device to the dispenser, each delivery duct being able to be disconnected from the modular batching member; and
   d) a supporting structure equipped with a plurality of seats, each seat being adapted to operatively house one modular batching member and comprising a first fluid connecting means for an operative connection to the second fluid connecting means and a first electric connecting means for an operative connection to the second electric connecting means, the first electric connecting means being quick-connection electric connectors or pins;

where each batching and delivering device comprises a pump comprising an inlet end connected to the container, and comprises an outlet end connected to the delivery duct;

where each modular batching member is connected to one of the plurality of seats by a mechanical connector;

where each pump comprises an external stator housing and an internal rotor within the external stator;

where the internal rotor has an axis of rotation, and where the internal rotor is capable of rotating in a first direction around the axis of rotation, and is capable of rotating in a second direction that is around the axis of rotation, where the first direction is opposite of the second direction;

where each external stator housing comprises progressive recesses and each internal rotor is shaped as a worm screw and comprises progressive recesses; and where rotation of the internal rotor relative to the external stator housing moves component inside the pump through the progressive recesses and toward the delivery duct corresponding to the batching and delivering device and therefore toward the dispenser when the internal rotor rotates in the first direction, or away from the delivery duct of the corresponding batching and delivering device and therefore toward the container when the internal rotor rotates in the second direction.

2. The modular dye meter of claim 1, where the container for storing one component of the compound comprises a tank.

3. The modular dye meter of claim 1, where the container for storing one component of the compound comprises a stirring blade driven by an actuating motor.

4. The modular dye meter of claim 1, further comprising managing means for controlling the modular batching members.

5. A dye metering machine comprising the modular dye meter of claim 1.

6. The dye metering machine of claim 5, where the dye metering machine comprises a containing structure;
   where the containing structure comprises removable coating panels, of the modular dye meter; and
   where the containing structure further comprises a height-adjustable plate for supporting at least one vessel under the dispenser.

* * * * *